United States Patent [19]

Hawley

[11] 4,311,294

[45] Jan. 19, 1982

[54] FLUTE OR PICCOLO STAND

[76] Inventor: Ronald E. Hawley, 1117 Tower Dr., Vista, Calif. 92083

[21] Appl. No.: 165,757

[22] Filed: Jul. 3, 1980

[51] Int. Cl.³ .............................................. F16M 11/32
[52] U.S. Cl. .................................... 248/165; 211/205; 248/188.7
[58] Field of Search ....................... 248/168, 176, 188.7, 248/165, 164, 188.6, 435, 121, 188; 84/327, 329; 211/203, 205

[56] References Cited

U.S. PATENT DOCUMENTS

| 723,114 | 3/1903 | Witt | 248/435 X |
|---|---|---|---|
| 2,248,273 | 7/1941 | Krajnc | 248/121 |
| 2,503,997 | 4/1950 | Miller | 248/188.5 |
| 2,920,851 | 1/1960 | Carlini | 248/171 |
| 3,199,818 | 8/1965 | Ahara | 248/188.5 X |
| 3,357,666 | 12/1967 | Smith et al. | 248/435 |
| 3,618,885 | 11/1971 | Muller | 248/435 X |

FOREIGN PATENT DOCUMENTS

| 2524907 | 12/1976 | Fed. Rep. of Germany ... 248/188.7 |
|---|---|---|
| 868728 | 5/1961 | United Kingdom ............... 248/165 |

*Primary Examiner*—J. Franklin Foss
*Attorney, Agent, or Firm*—Fulwider, Patton, Rieber, Lee & Utecht

[57] ABSTRACT

A collapsable flute or piccolo stand adapted to receive the end of a flute or piccolo and support such musical instrument in an upright position. The stand includes a base to which is threadably attached an upright post to receive the musical instrument. A plurality of legs are releasably secured to the base by tightening the post relative thereto. Untightening the post releases the legs so as to collapse the stand.

1 Claim, 5 Drawing Figures

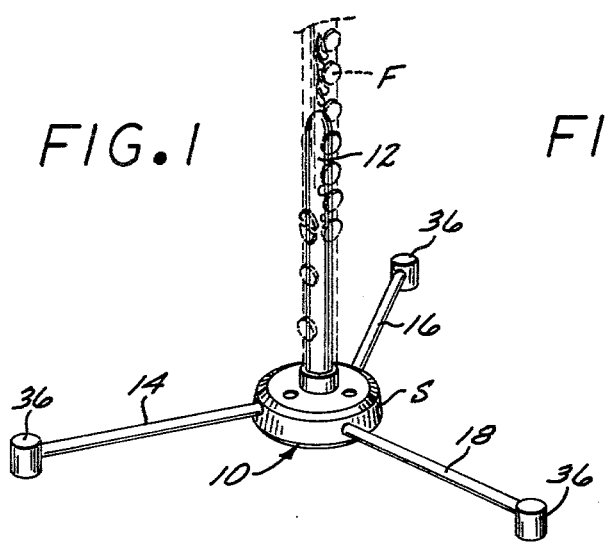
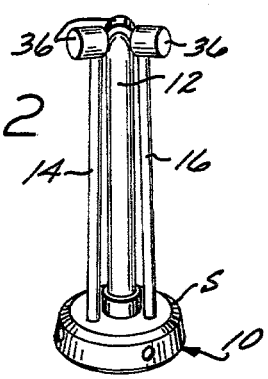
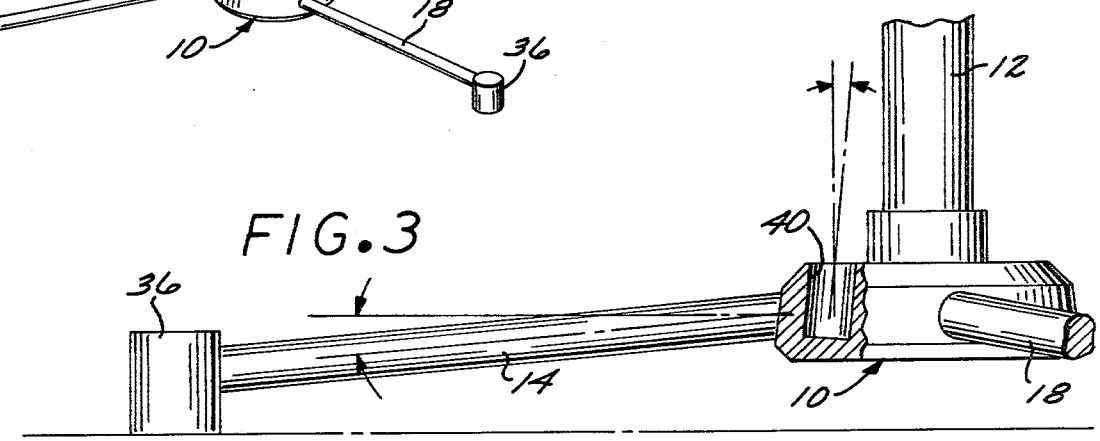
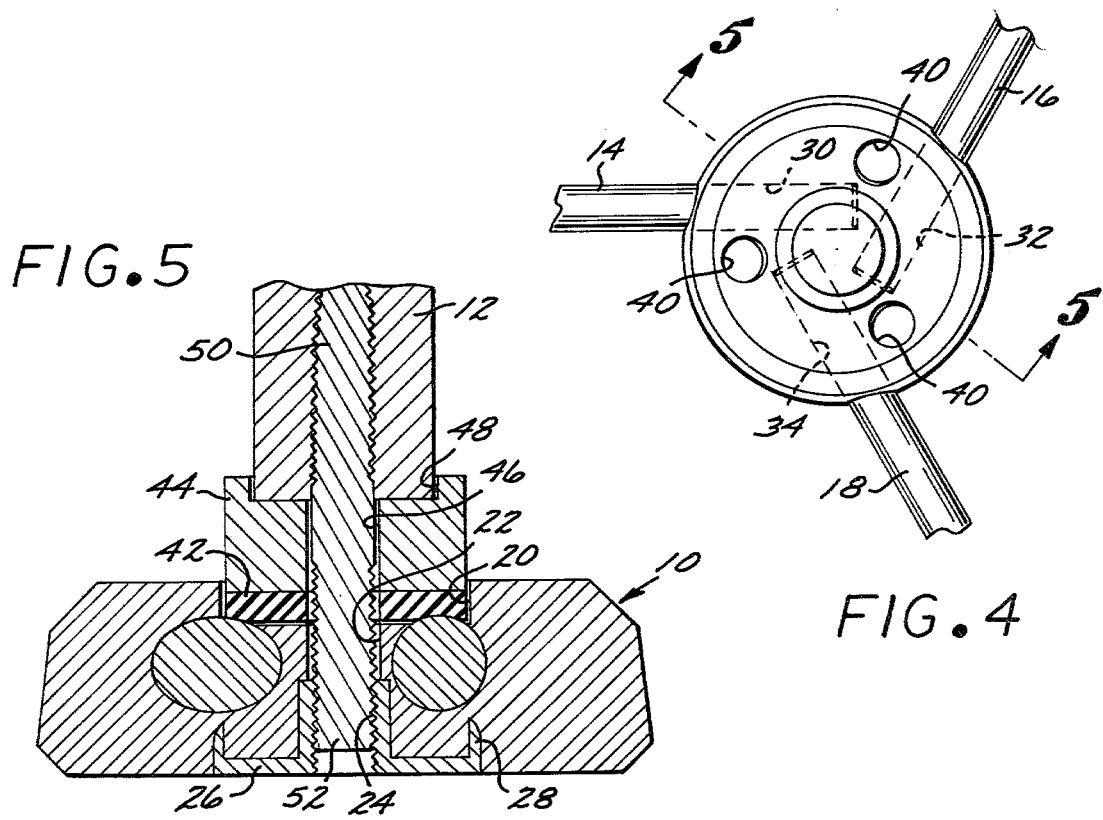

FLUTE OR PICCOLO STAND

BACKGROUND OF THE INVENTION

The only stands presently available for supporting a flute or piccolo are complicated and expensive. There is a need for a simple, inexpensive and sturdy collapsable stand for a flute or piccolo.

SUMMARY OF THE INVENTION

It is a major object of the present invention to provide a collapsable flute or piccolo stand which is sturdy, yet inexpensive to manufacture.

Another object of the invention is to provide a flute or piccolo stand of the aforedescribed nature which will positively support a flute or piccolo without the danger of scratching such instrument.

Another object of the present invention is to provide a flute or piccolo stand of the aforedescribed nature which includes a base provided with an upstanding threadably mounted post, such post receiving the flute or piccolo and with the base being formed with a plurality of axially extending passages each of which removably slidably receives a supporting leg, and with a resilient washer being squeezed against the inner portions of the legs by a tightening of the post relative to the stand to temporarily lock the legs in place.

Other objects and advantages of the present invention will become apparent from the following detailed description of a preferred embodiment thereof.

BRIEF DESCRIPTION OF THE DRAWINGS

FIG. 1 is a perspective view of a flute or piccolo stand embodying the present invention in position to support a flute or piccolo;

FIG. 2 is a perspective view similar to FIG. 1, but showing such stand in its collapsed position;

FIG. 3 is a side elevational view, partly broken away in vertical section showing the construction of said stand;

FIG. 4 is a broken top plan view of said stand; and

FIG. 5 is a vertical sectional view taken in enlarged scale along line 5—5 of FIG. 4.

DESCRIPTION OF A PREFERRED EMBODIMENT

Referring to the drawings, a preferred form of flute or piccolo stand S embodying the invention is adapted to to support a musical instrument such as a flute or piccolo F in an upright position, as indicated in FIG. 1. The stand S includes a base generally designated 10 upon which a post 12 is threadably mounted. A plurality of generally horizontally extending legs 14, 16 and 18, are releasably secured to the base 10 for supporting the base and musical instrument F. These legs, however, are removable so as to be supported upon the base 10 in a generally vertically extending position whereby the stand S may be readily transported or stored.

More particularly, base 10 is of generally cylindrical configuration and is formed with a coaxial cylindrical open topped recess 20. The lower portion of recess 20 merges into a coaxial opening 22 formed in base 10. The lower part of such opening 22 merges into a threaded bore 24 formed in a metallic retainer 26. The metallic retainer 26 may take the form of a conventional T-nut having upstanding spikes 28 which are driven into the lower portion of wooden base 10 to secure such T-nut in place.

Base 10 is also formed with a plurality of generally horizontally extending passages 30, 32 and 34, that radiate axially from recess 20. The upper part of the radially inner portions of which passages coincide with and are exposed to the peripheral portion of the bottom of recess 20. These passages removably slidably receive the inner portions of legs 14, 16 and 18. The outer ends of such legs are rigidly attached to feet 36. As shown particularly in FIG. 3, base 10 is also formed with a plurality of upwardly-opening, generally vertically extending blind passages 40, corresponding in number and diameter to the aforementioned passages 30, 32 and 34. Such passages 40 releasably receive the inner portions of such legs when the stand is arranged in its collapsed position of FIG. 2. The passages 30, 32 and 34 may be inclined downwardly at the same angle blind passages 40 are inclined inwardly relative to base 10, as shown in FIG. 3.

Referring again to FIG. 5, a resilient washer 42 is disposed in the recess 20. Above such washer 42 is arranged a generally cylindrical pressure pad 44 formed with a coaxial bore 46, the upper end of which merges into a cavity 48 occupied by the lower end of mounting post 12. The lower portion of mounting post 12 is rigidly affixed to the upper portion of a stud 50 having a threaded lower portion 52. The stud 50 is shown extending downwardly through bore 22 of base 10 into releasable threaded engagement with the threads 24 of T-nut 26.

In the use of the aforedescribed flute or piccolo stand S, such stand may be readily carried when arranged in its collapsed position of FIG. 2. When the stand is to be utilized to support a musical instrument, legs 14, 16 and 18 are removed from the blind passages 40 and inserted within the passages 30, 32 and 34. Mounting post 12 is then rotated so as to cause the lower portion 52 of stud 50 to move downwardly within bore 24 of retainer 26. Such downward movement of mounting post 12 effects concurrent downward movement of pressure pad 44 so as to compress resilient washer 42 against the inner portions of legs 14, 16 and 18 exposed to recess 20. The legs are thereby firmly locked into their generally horizontally extending positions shown in FIGS. 1, 3 and 4. Stand S is then ready to receive the flute or piccolo F, and will provide a sturdy and stable support therefor. When it is desired to again collapse stand S, mounting post 12 is merely unthreaded relative to base 10 so as to release the inner portions of legs 14, 16 and 18 from the base. Thereafter, the inner ends of such legs are inserted within blind bores 40. It will be understood that the legs have a snug fit with such blind bores so as to be frictionally retained therewithin.

Also, the spatial relationship of the elements of the stand is preferably so selected that feet 36 will abut post 12 and thereby exert a binding force against the post. In this manner the legs will tend to be retained in their stored position.

Various modifications and changes may be made with respect to the foregoing detailed description, without departing from the spirit of the present invention.

I claim:

1. A portable collapsable flute or piccolo stand, comprising:

a base formed with an open topped recess, a vertically extending threaded bore coaxial with said recess, and a plurality of upward-opening blind passages;

a plurality of generally horizontally extending passages that radiate axially from said recess with the upper part of their radially inner portions coinciding with the bottom of said recess;

a resilient washer disposed in said recess;

a plurality of legs each having its inner portion removably slidably received within one of said horizontally extending passages;

a center post having a threaded stud depending from its underside, said stud being threadably engagable with the threaded bore of said base; and pressure-applying means consisting of a generally cylindrical pressure pad formed with a coaxial bore through which extends said stud interposed between the underside of said post and said washer whereby downward rotational movement of said post will cause said washer to exert a downward locking force on the radially inner portions of said legs, and with said blind passages removably snugly receiving the inner portions of said legs when said stand is collapsed.

* * * * *